United States Patent [19]
Wiese

[11] 3,858,890

[45] Jan. 7, 1975

[54] SPRING-LOADED MECHANICAL SEAL WITH TORQUE CONTROL

[75] Inventor: Winfred J. Wiese, Whittier, Calif.

[73] Assignee: Borg-Warner Corporation, Chicago, Ill.

[22] Filed: Mar. 23, 1973

[21] Appl. No.: 344,379

[52] U.S. Cl. .................. 277/93 R, 277/83
[51] Int. Cl. ............................ F16j 15/34
[58] Field of Search .......... 277/3, 27, 41, 87, 93 R, 277/93 SD

[56] References Cited
UNITED STATES PATENTS

| | | | |
|---|---|---|---|
| 3,052,475 | 9/1962 | Carfagna | 277/93 |
| 3,198,529 | 8/1965 | Voitik | 277/3 |
| 3,445,119 | 5/1969 | Andresen et al | 277/3 |
| 3,459,430 | 8/1969 | Ball | 277/3 |
| 3,612,548 | 10/1971 | Tracy | 277/93 |
| 3,628,799 | 12/1971 | Wiese | 277/27 |

Primary Examiner—Samuel B. Rothberg
Attorney, Agent, or Firm—John O. Evans, Jr.

[57] ABSTRACT

A spring-loaded mechanical seal having a device responsive to the torque developed between the relatively rotating sealing rings of the mechanical seal for producing a force that is applied in opposition to the spring force, thereby tending to urge the spring-loaded sealing face away from sealing engagement with the other of the sealing faces, and enabling the spring-loaded seal face to assume an equilibrium position that is a function of the torque. The spring loaded mechanical seal is adapted to operate in either direction of rotation. In one of the disclosed forms, the force that is applied in opposition to the spring force does not urge the spring-biased sealing ring positively away from the other sealing ring; instead, it merely allows it to move away in response to hydraulic forces.

13 Claims, 7 Drawing Figures

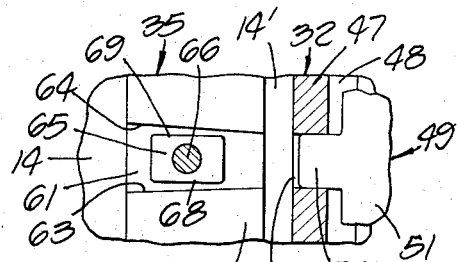
FIG. 2.
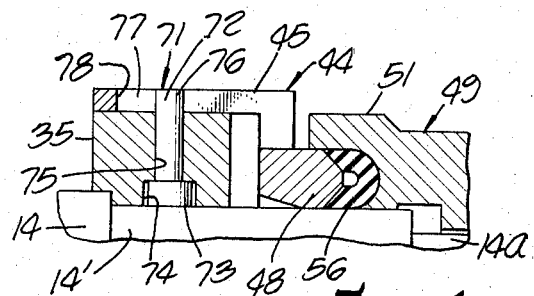
FIG. 4.
FIG. 1.
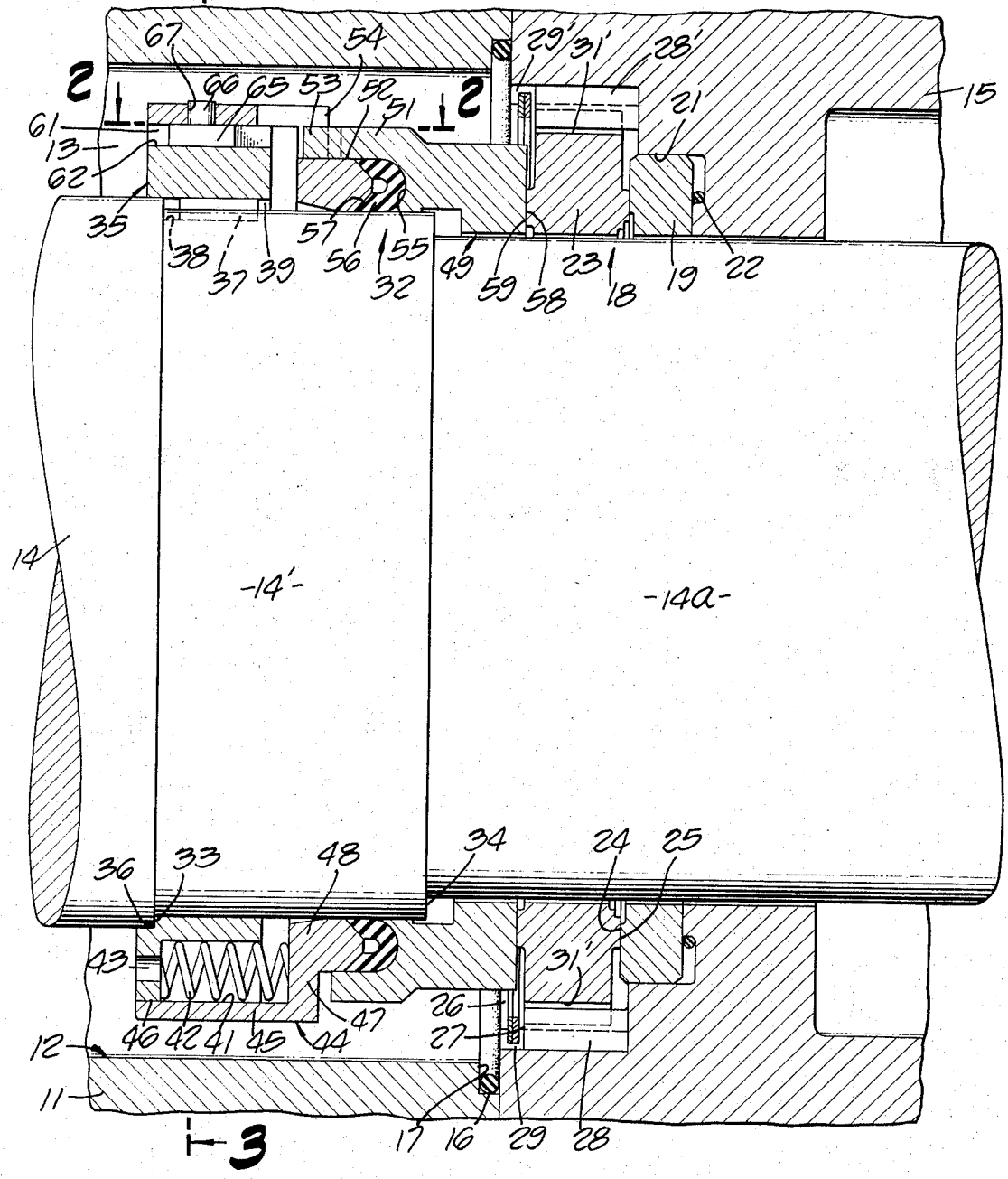

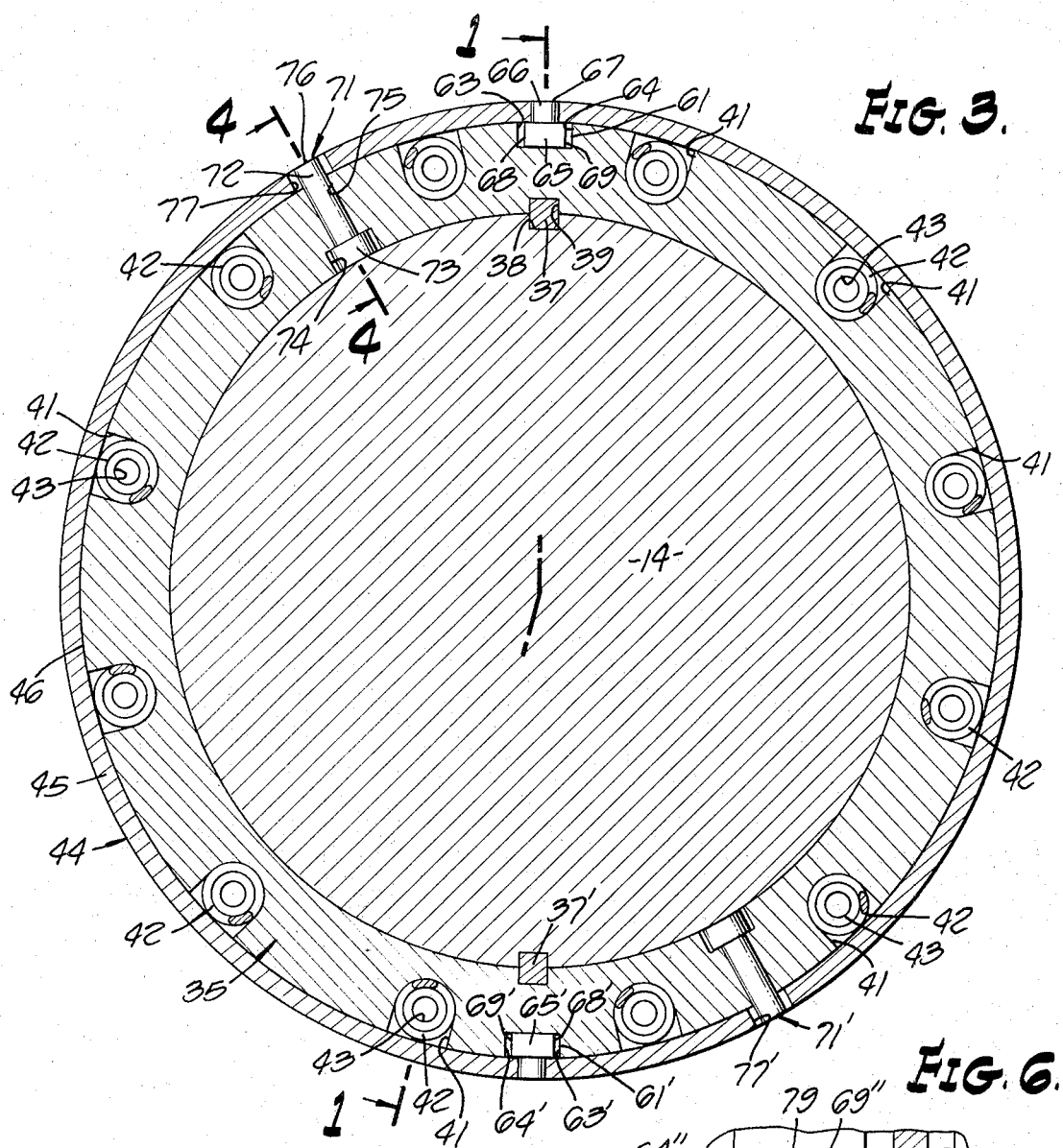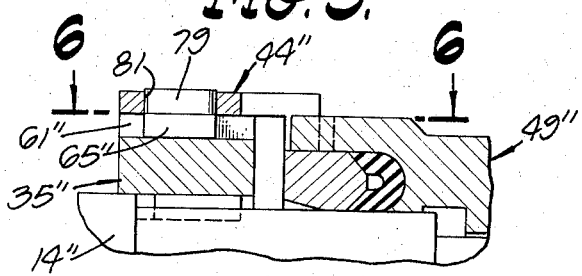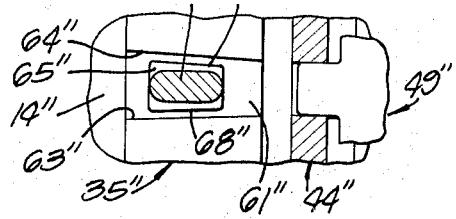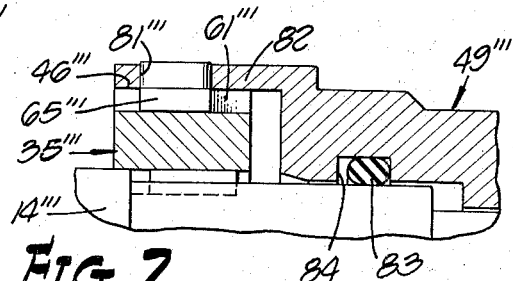

SPRING-LOADED MECHANICAL SEAL WITH TORQUE CONTROL

BACKGROUND OF THE INVENTION

1. Field of the Invention

This invention relates to mechanical seals.

2. Description of the Prior Art

In heretofore known mechanical seals, wherein one of the sealing faces is spring-biased into sealing relation with the other of the sealing faces, particularly where high-pressure liquids are being sealed or where high shaft speeds are encountered, one or both of the cooperating sealing faces may develop defects such as abnormal wear, thermal cracking and the like. Such defects are generally related to the development of high torque between the sealing rings. Such defects are most likely to occur under starting conditions when the lubricating film of liquid between the sealing rings has been largely lost. During running, high torque conditions may develop when the lubricating film is lost from between the sealing rings.

An arrangement for mitigating the foregoing difficulties is disclosed in U.S. Pat. No. 3,052,475, issued Sept. 4, 1962, to A. Carfagna, for "Mechanical Seals for the Stuffing Boxes of Rotary Machines." The mechanical seal of the Carfagna patent includes a helical cam arrangement for producing a force that is applied in opposition to the spring force. However, it is capable of operation in only one direction of rotation and it positively urges the spring-biased sealing face to move away from the complementary sealing face.

SUMMARY OF THE INVENTION

An object of the invention is to provide a mechanical seal of the foregoing nature that may be operated in either direction of rotation.

A further object is to provide a mechanical seal wherein the spring-biased sealing ring is not positively urged away from the complementary sealing ring, but is allowed to move away from it responsive to hydraulic forces.

Another object is to provide a mechanical seal that achieves the immediately preceding object, and that has improved sealing means for sealing a rotary, spring-biased sealing ring to the shaft.

In accordance with the present invention there is provided mechanical seal apparatus for sealing a rotary shaft to a housing having an opening through which the shaft extends including a first sealing ring, means for mounting the first sealing ring on the housing, a second sealing ring, means for mounting the second sealing ring on the shaft, the first and second sealing rings having complemental, opposed radial sealing faces, resilient means for applying a biasing force to one of the sealing rings for urging it axially into sealing relationship with the other of the sealing rings, and means responsive to the torque produced by the drag between the sealing rings upon their relative rotation in either direction for applying to the resilient means a force opposed to the biasing force.

In accordance with another aspect of the invention, there is provided mechanical seal apparatus for sealing a rotary shaft to a housing having an opening through which the shaft extends including a stationary sealing ring, means for mounting the stationary sealing ring on the housing, a rotary sealing ring, means for mounting the rotary sealing ring on the shaft, the stationary and rotary sealing rings having complemental, opposed radial sealing faces, resilient means for applying a biasing force to the rotary sealing ring for urging it axially into sealing relationship with the stationary sealing ring, and means associated with the resilient means and responsive to the torque produced by the drag between the sealing rings upon their relative rotation for applying to the resilient means a force opposed to the biasing force, the last mentioned means comprising a first cam member, means for fixedly mounting the first cam member on the shaft, a second cam member, means for mounting the second cam member on the shaft for limited axial and limited rotational shifting movements thereon, slip joint means connecting the second cam member to the rotary sealing ring for rotation therewith and for axial shifting relative thereto, interengaging surfaces on the second cam member and on the rotary sealing ring for moving the rotary sealing ring into sealing relationship with the stationary sealing ring, the interengaging surfaces permitting the second cam member to move axially away from the rotary sealing ring, spring means compressed between the first cam member and the second cam member for biasing the second cam member and the rotary sealing ring into sealing relationship, and cooperating cam surfaces on the cam members adapted to shift the second cam member axially away from the rotary sealing ring responsive to rotation in a given direction of the second cam member relative to the first cam member to further compress the spring means.

The invention will be described with greater particularity in the following detailed description of three embodiments as shown in the accompanying drawings.

BRIEF DESCRIPTION OF THE DRAWINGS

FIG. 1 is an axial sectional view of mechanical seal apparatus embodying the invention, taken along the line 1—1 of FIG. 3;

FIG. 2 is a sectional view taken along the line 2—2 of FIG. 1;

FIG. 3 is a sectional view taken along the line 3—3 of FIG. 1;

FIG. 4 is a sectional view taken along the line 4—4 of FIG. 3;

FIG. 5 is a fragmentary sectional view of a modified form of mechanical seal apparatus embodying the invention;

FIG. 6 is a sectional view taken along the line 6—6 of FIG. 5;

FIG. 7 is a fragmentary view of another modified form of mechanical seal apparatus in accordance with the invention.

DESCRIPTION OF THE PREFERRED EMBODIMENTS

Referring to the drawings, particularly to FIGS. 1 to 4, there is shown a portion of a housing 11, such as a pump housing. The housing has a shaft opening 12 providing a stuffing box 13. A rotary shaft 14 extends through the shaft opening into the interior of the housing 11 and may have a pump impeller (not shown) mounted on its left-hand end and within the housing and a motor (not shown) coupled to its right-hand end. The shaft is journalled in suitable bearings (not shown). The stuffing box 13 is closed by a flange 15 that surrounds the shaft with a close clearance and that is secured to the housing by suitable fasteners (not shown). An O-ring gasket 16, seated in a groove 17, seals the flange to the housing.

The flange carries a non-rotating or stationary sealing ring means designated by the general reference numeral 18. This sealing ring means has a back-up ring 19 received in a counterbore 21 in the flange and sealed therein by an O-ring gasket 22. The back-up ring supports a stationary sealing ring 23 against movement to the right, as seen in FIG. 1. An annular lapped surface 24 is provided on the front of the backup ring and abuts an opposed annular lapped face 25 on the back of the stationary sealing ring 23 to form a fluid-tight joint between these two rings.

The stationary sealing ring is received in an enlarged bore 26 in the flange 15 and is retained therein by a spiral snap ring 27 when the flange is removed from the housing. Rotation of the stationary seal ring 23 is prevented by a pair of diametrically positioned keys 28, 28', or similar drive members, fitted in grooves 29, 29' in the flange and retained therein as by welding. The keys are received in corresponding keyways 31,31' provided in the outer periphery of the stationary sealing ring.

A rotary sealing ring means, designated by the general reference numeral 32, is mounted on the shaft 14 in sealing relation with the shaft and with the stationary sealing ring means 18. The shaft 14 has a reduced-diameter portion 14' forming a shoulder 33, and still further reduced portion 14a forming another shoulder 34. A spring carrier ring 35 is mounted on the shaft and has a groove 36 engaged with the shoulder 33 to prevent the ring 35 from sliding to the left on the shaft, as seen in FIG. 1. A key 37, fitted in a groove 38 in the shaft, projects into a keyway 39 in the spring carrier ring to fix the latter against rotation relative to the shaft. A similar key 37' (see FIG. 3) is disposed diametrically opposite to the key 37 and is similarly arranged. The spring carrier ring has a number of longitudinal spring pockets 41 evenly spaced about its outer periphery, and each pocket has a compression spring 42 received therein. Flush holes 43 are provided in the rear of each spring pocket to enable liquid to circulate through the spring pockets to flush out foreign matter.

Mounted on the spring carrier ring is a U-cap seal follower 44. The follower has an outer ring portion 45, slidably fitted on the outer periphery 46 of the spring carrier ring 35, an inturned flange portion 47, and a forwardly projecting U-cup-contacting ring portion 48. It will be seen that the compression springs 42 press against the rear of the flange portion 47 to urge the U-cup follower to the right, as seen in FIG. 1.

A rotary sealing ring 49 is axially slidably mounted on the reduced portion 14' of the shaft 14 and has a rearwardly extending flange 51 slidable on the radially outer surface 52 of the U-cup-contacting ring portion 48. This flange has a tang 53 projecting into a slot 54 in the U-cup follower 44 to form a slip joint providing a rotary driving connection between the follower and the rotary sealing ring 49. This slip joint allows the follower to move rearwardly away from the rotary sealing ring while maintaining a driving connection therewith.

An annular recess 55 is provided in a rear surface of the rotary sealing ring to receive an elastomeric U-cup sealing gasket 56, the rear surface of the U-cup gasket having a tapered annular slot 57 which receives the correspondingly tapered nose of the U-cup-contacting ring portion 48 of the follower 44. This gasket statically seals the rotary sealing ring to the shaft, and provides a member through which the rotary sealing ring is urged to the right by the follower 44.

The rotary sealing ring has a lapped sealing face 58 in opposed sealing relation to another lapped sealing face 59 on the stationary sealing ring 23.

Referring to FIGS. 1, 2 and 3, it will be seen that the spring carrier 35 has a longitudinal cam slot 61 provided in its outer periphery. The cam slot has a bottom surface 62 and sidewalls providing cam surfaces 63 and 64 that diverge rearwardly of the spring carrier. A cam bar 65 is received in the cam slot and has an integral pivot pin 66 journalled in a pivot pin hole 67 drilled in the outer ring portion 45 of the follower 44. The cam bar has longitudinal and parallel sides that provide cam surfaces 68 and 69 that cooperate respectively with the cam surfaces 63 and 64 of the cam slot. The cam bar is spaced from the sidewalls of the cam slot a distance sufficient to allow the cam bar to pivot into cooperating camming relationship with either of the sidewalls of the slot, depending upon the direction of rotation of the spring carrier ring 35 with respect to the follower 44. As seen in FIG. 3, a similar cam slot 61' and cam bar 65' arrangement is provided diametrically opposite to the slot-and-bar 61,65 camming arrangement just described, the two such camming arrangements operating together in a manner to be described in greater detail hereinafter.

Referring to FIGS. 3 and 4, there are shown assembly pins 71 and 71' for retaining the spring carrier ring 35, the compression springs 42, and the U-cup seal follower 44 in subassembly relationship so that such subassembly may be easily installed on or removed from the shaft 14. As the assembly pins are identical and function identically, only the pin 71 will be further described. The assembly pin 71 has a shank 72 and a head 73, the head being received in a recess 74 provided in the inner periphery of the spring carrier ring 35, and the shank extending through a bore 75 in the spring carrier ring. The end 76 of the shank is received in a longitudinal slot 77 provided in the outer ring portion 45 of the follower 44. The length of the slot is such that the rear wall 78 thereof will abut the end 76 of the assembly pin and prevent the follower from being forced from the spring carrier ring by the springs 42 when these parts are removed from the shaft 14. After these parts, as a subassembly, have been removed from the shaft, the subassembly may be disassembled after the pins 71,71' have been withdrawn. The width of the slots 77,77' is such as to permit limited relative rotation of the follower 44 with respect to the spring carrier ring 35, such relative rotation being limited by abutment of the cam bars 65,65' with the sidewalls of the cam slots 61,61'.

In operation of the mechanical seal apparatus of FIGS. 1 to 4, let it be assumed that the shaft 14 is at rest, that water under a pressure of about 1,000 p.s.i. is being sealed in the stuffing box 13, and that the pressure outside of the flange 15 is atmospheric pressure. The force tending to move the rotary sealing ring 49 towards the stationary sealing ring 23 is the sum of the forces exerted by the compression springs 42 and the resultant of the hydraulic forces acting on the rotary sealing ring.

Assuming that the shaft has been at rest for some time, the lubricating film of water between the sealing faces 58 and 59 of the sealing rings 23 and 49 will have been substantially expelled, and the sealing faces are practically dry.

Let it be assumed that the shaft 14 is started in rotation in the clockwise direction, as viewed from the right in FIG. 1. The spring carrier ring 35, being keyed to the shaft, is turned clockwise until the cam surfaces 63,63' of the cam slots 61,61' contact the cam surfaces 68,68' of the cam bars 65,65'. The cam bars pivot on their pins to bring the cam surfaces of the bars into parallelism and full engagement with the cooperating cam surfaces of the cam slots. Thereupon, driving torque is transmitted to the U-cup seal follower 44 which drives the rotating sealing ring in the clockwise direction through the tang 53. Upon start-up, the drag between the faces of the opposed sealing rings 49 and 23 is relatively high. This drag is reflected in a reverse torque that is applied as a high force between the cooperating cam surfaces 68,63 and 68',63'. As these cam surfaces are disposed at a slight angle to the longitudinal axis of the seal system, and are inclined rearwardly and away from the direction of rotation, a resultant force is produced to move the cam bar 65 and the U-cup seal follower 44 to the rear, thereby further compressing the springs 42 and relieving the spring bias on the rotary sealing ring 49. This allows the rotary sealing ring to move correspondingly to the rear to separate the complementary sealing faces 58 and 59 and to permit a film of water to enter between the sealing faces to lubricate them and lessen the drag. This decreased drag is reflected in lower torque and lower forces between the cooperating cam surfaces 68,63 and 68',63'. A balance will be achieved between the forces tending to move the U-cup seal follower to the rear and the restoring forces of the springs 42 and the resultant of the hydraulic forces acting on the rotary sealing ring, which will result in disposing the parts in an equilibrium position which is a function of the torque produced by the drag between the relatively rotating seal faces.

It will be apparent that a similar mode of operation will occur when the shaft is rotated in a counterclockwise direction, as viewed from the right in FIG. 1, in which case the cam surfaces 64,69 and 64',69' will be the operative cam surfaces.

A modified form of cam bar is embodied in the apparatus shown in FIGS. 5 and 6, to which figures reference is now made. In these figures, parts corresponding to the same or similar parts in FIGS. 1 to 4 are designated by corresponding but double-primed numerals. It will be understood that the cam bar arrangement of FIGS. 5 and 6 may be substituted for the cam bar construction of FIGS. 1 to 4.

Referring to FIGS. 5 and 6, the shaft is shown at 14", the spring carrier ring at 35", the U-cup seal follower at 44", the rotary sealing ring at 49", and the modified cam bar at 65". This cam bar has a mounting lug 79 that is elongated longitudinally of the mechanical seal assembly, the mounting lug being received in a corresponding elongated slot 81 in the U-cup seal follower 44". The cam bar has cam surfaces 68" and 69" on opposite longitudinal sides, and these cam surfaces cooperate respectively with the opposed cam surfaces 63" and 64" of the cam slot 61". Since the cam bar 65" is not pivoted to the U-cup follower 44", the cam faces 68",69" thereof are cut so that they are parallel to the respective cooperating cam surfaces 63" and 64" to provide for complete engagement of the respective cam surfaces.

It is here noted that if the modified cam bar 65" of FIGS. 5 and 6 is to function properly, it must be mounted on the U-cup follower 44" in the illustrated orientation, i.e., with the cooperating cam surfaces of the bar and the slot in parallel disposition. As distinguished from this, the cam bar 65 of the apparatus of FIGS. 1 to 4, with its parallel sides, may be mounted on the U-cup follower 44 with either side facing in the direction of rotation. Thus, the cam bar 65 may be considered foolproof, insofar as concerns its installation.

Another modification of the mechanical seal apparatus of the invention is shown in FIG. 7. This apparatus is similar to that shown in FIGS. 5 and 6. Parts that are common to the apparatus of FIGS. 5 and 6 and that of FIG. 7, are designated in FIG. 7 by corresponding but triple-primed reference numerals. In FIG. 7, the rotary shaft is designated by the numeral 14''', the spring carrier ring by 35''' the cam bar by 65''', and the rotary sealing ring by 49'''.

In FIG. 7, the rotary sealing ring 49''' is shown as having an integral, rearwardly extending annular flange 82 slidable on the outer periphery 46''' of the spring carrier ring. The flange carries the cam bar 65''' in an elongated slot 81''', and the cam bar 65''' cooperates with the cam slot means 61''' in the same manner as the cam bar 65" and the cam slot 61" cooperate in the device of FIGS. 5 and 6. The compression springs, corresponding to the springs 42 of FIG. 1 (not seen in FIG. 7) act directly upon the rotary sealing face 49''' to urge it to the right, as seen in FIG. 7. An O-ring gasket 83, received in an annular O-ring groove 84 in the rotary sealing ring 49''', seals the latter to the shaft 14'''.

The mechanical seal arrangement of FIG. 7 operates in a manner very similar to the way in which the devices of FIGS. 1 to 4 and FIGS. 5 and 6 operate, as described hereinbefore, but with the main difference that the rotary sealing ring 49''' of the FIG. 7 device is positively moved in the rearward direction, whereas the rotary sealing rings 49 and 49" move rearwardly by following the rearward movement of the U-cup seal follower 44 or 44", as the case may be. Such rearward movement, in any of the described embodiments is effected in response to the interaction of the respective cam bars and cam slots in response to torque produced by drag between the respective rotary and stationary sealing rings. In operation of the arrangement of FIG. 7, the rotary sealing ring 49''' will seek an equilibrium position spaced from the stationary sealing ring as determined by the balance of spring force, the resultant hydraulic force acting on the rotary sealing ring, and the force applied to the rotary sealing ring through the cam system that results from drag between the complementary sealing faces of the sealing rings.

The cam angle is defined herein as the angle between a line parallel to the axis of rotation and one of the cam surfaces, such as the cam surface 63 or 64 of FIG. 1. Such cam angle is an acute angle, i.e., an angle less than 90° and greater than 0°. In practice, the cam angle will usually be less than 45°, but under certain conditions it may be greater. Factors which govern the selection of the cam angle are shaft speed, temperature and pressure of the liquid being sealed, diameter of the sealing rings, the nature of the liquid being sealed, the amount of axial movement of the shaft, and the like.

The ordinarily skilled mechanical seal designer will have little difficulty in selecting an appropriate cam angle on the basis of experience and, perhaps, minimal experimentation. In general, the greater the cam angle, the more sensitive the cam action will be.

The cooperating cam surfaces may be of the same or of different materials. For example, when conditions are not too severe, both cam surfaces may be of steel. If high friction and sometimes galling should occur between the cam surfaces, one of the surfaces may be of steel and the other of a lower friction material, such as brass or nylon.

Although the invention may be applied to resiliently biased mechanical seals in general, it is especially adapted to use in connection with balanced mechanical seals.

Although the present invention is shown in the drawings in association with the rotary sealing ring, it may easily be adapted to association with the stationary ring of the mechanical seal, as will be apparent to one ordinarily skilled in the mechanical seal art.

The materials of which the sealing rings are made may be those commonly employed. For example, the stationary ring may be made of carbon, and the rotary ring may be made of stainless steel having a hard faced sealing surface of Stellite or other hard facing material.

In accordance with the present invention, the spring-biased sealing ring shifts away from the opposing sealing rings regardless of the direction of rotation, whereas, in the arrangement of the Carfagna patent, rotation of the shaft in the opposite direction from that for which the seal assembly is designed will increase, rather than decrease, the loading of the axially adjustable sealing ring, thereby augmenting the difficulties of seal wear, heat checking, and the like.

In the construction according to FIGS. 1 through 6 of the present application, the axially shiftable sealing ring may assume an equilibrium position solely in response to hydraulic forces, under certain conditions of operation.

Moreover, in accordance with the forms of the invention shown in FIGS. 1 to 4 and FIGS. 5 and 6, the employment of a U-cup seal 56 and U-cup seal follower 44 is especially advantageous when, at start-up, the shaft end-play allows the shaft to shift axially a small distance to the right, as seen in FIG. 1. Under such conditions, the friction between the sealing rings increases greatly, and the U-cup follower 44 responds by moving to the left. When this occurs, the pressure of the U-cup follower on the U-cup is relieved, thereby relieving the friction between the U-cup and the shaft to facilitate the shifting of the rotary sealing ring 49 to lower the drag between the cooperating sealing rings.

The foregoing description and the drawings disclose three specific forms embodying the invention. Such disclosure is to be considered as illustrative and not limitative of the invention, the scope of the invention being best defined in the following claims.

I claim:

1. Mechanical seal apparatus for sealing a rotary shaft to a housing having an opening through which the shaft extends comprising: a stationary sealing ring, means for mounting said stationary sealing ring on the housing, a rotary sealing ring, means for mounting said rotary sealing ring on the shaft for limited axial and limited rotational shifting movements thereon, said sealing rings having complemental, opposed radial sealing faces, resilient means for applying a biasing force to said rotary sealing ring for urging it axially into sealing relationship with said stationary sealing ring, and means associated with said resilient means and responsive to the torque produced by the drag between said sealing rings upon their relative rotation in either direction for applying to said resilient means a force opposed to said biasing force to urge said rotary sealing ring away from said stationary sealing ring, said means associated with said resilient means including first cooperating cam means carried by said shaft and said rotary sealing ring and responsive to rotational shifting of said rotary sealing ring on the shaft for producing said force opposed to said biasing force upon relative rotation of said sealing rings in one direction, and second cooperating cam means carried by said shaft and said rotary sealing ring and responsive to rotational shifting of said rotary sealing ring on the shaft for producing said force opposed to said biasing force upon relative rotation of said sealing rings in the opposite direction.

2. Mechanical seal apparatus as defined in claim 1, wherein said first cooperating cam means includes a first cam member and means for fixedly mounting said first cam member on the shaft, said second cooperating cam means includes a second cam member and means for mounting said second cam member on said rotary sealing ring, first cooperating cam surfaces on said cam members adapted to shift said rotary sealing ring away from said stationary sealing ring responsive to rotation in a given direction of said rotary sealing ring relative to said first cam member, and second cooperating cam surfaces on said cam members adapted to shift said rotary sealing ring axially away from said stationary sealing ring responsive to rotation in the opposite direction of said rotary sealing ring relative to said first cam member.

3. Mechanical seal apparatus as defined in claim 2 wherein one of said cam members comprises longitudinally extending cam slot means having opposite walls providing cam surfaces, and the other of said cam members comprises a longitudinally extending cam bar disposed in said slot means and providing cam surfaces on opposite sides thereof that cooperate with the cam surfaces provided by the walls of said cam slot means.

4. Mechanical seal apparatus as defined in claim 3 wherein said cam surfaces of said cam slot means diverge in the rearward direction.

5. Mechanical seal apparatus as defined in claim 4 wherein said cam bar is a pivoted element of said second cam member, and the cam surfaces thereof are parallel to each other.

6. Mechanical seal apparatus as defined in claim 4 wherein said cam bar is a stationary element of said second cam member, and the cam surfaces thereof are parallel to the cam surfaces of said cam slot means.

7. Mechanical seal apparatus for sealing a rotary shaft to a housing having an opening through which the shaft extends including a stationary sealing ring, means for mounting said stationary sealing ring on the housing, a rotary sealing ring, means for mounting said rotary sealing ring on the shaft, said stationary and rotary sealing rings having complemental, opposed radial sealing faces, resilient means for applying a biasing force to said rotary sealing ring for urging it axially into sealing relationship with said stationary sealing ring, and means associated with said resilient means and responsive to the torque produced by the drag between said sealing rings upon their relative rotation for applying to said resilient means a force opposed to said biasing force, said last mentioned means comprising a first cam member, means for fixedly mounting said first cam member on the shaft, a second cam member, means for mounting said second cam member on the shaft for limited axial and limited rotational shifting movements thereon, slip joint means connecting said second cam member to said rotary sealing ring for rotation therewith and for axial shifting relative thereto, interengaging surfaces on said second cam member and on said rotary sealing ring for moving said rotary sealing ring into sealing relationship with said stationary sealing ring, said interengaging surfaces permitting said second cam member to move axially away from said rotary sealing ring, said resilient means comprising spring means compressed between said first cam member and said second cam member for biasing said second cam member and said rotary sealing ring into sealing relationship, and cooperating cam surfaces on said cam members adapted to shift said second cam member axially away from said rotary sealing ring responsive to rotation in a given direction of said second cam member relative to said first cam member to further compress said spring means.

8. Mechanical seal apparatus as defined in claim 7 wherein said cam members have second cooperating cam surfaces adapted to shift said second cam member axially away from said rotary sealing ring responsive to rotation in the opposite direction of said second cam member relative to said first cam member to further compress said spring means.

9. Mechanical seal apparatus as defined in claim 8 wherein said first cam member comprises longitudinally extending cam slot means having opposite walls providing cam surfaces, and said second cam member comprises a longitudinally extending cam bar disposed in said slot means and providing cam surfaces on opposite sides thereof that cooperate with the cam surfaces provided by the walls of said cam slot means.

10. Mechanical seal apparatus as defined in claim 9 wherein said cam surfaces of said cam slot means diverge in the rearward direction.

11. Mechanical seal apparatus as defined in claim 10 wherein said cam bar is a pivoted element of said second cam member, and the cam surfaces thereof are parallel to each other.

12. Mechanical seal apparatus as defined in claim 10 wherein said cam bar is a stationary element of said second cam member, and the cam surfaces thereof are parallel to the cam surfaces of said cam slot means.

13. Mechanical seal apparatus as defined in claim 7 including annular elastomeric gasket means carried by said rotary sealing ring for sealing said rotary sealing ring to the shaft, and wherein the interengaging surface on said rotary sealing ring comprises a surface on said gasket means.

* * * * *